（12） United States Patent
Hill

（10） Patent No.: US 9,811,553 B2
（45） Date of Patent: Nov. 7, 2017

（54） METHODS AND SYSTEMS FOR DATA AGGREGATION AND REPORTING

（75） Inventor: David Gordon Hill, Arlington, MA (US)

（73） Assignee: Entegrity LLC, Arlington, MA (US)

（*） Notice: Subject to any disclaimer, the term of this patent is extended or adjusted under 35 U.S.C. 154(b) by 839 days.

（21） Appl. No.: 13/046,352

（22） Filed: Mar. 11, 2011

（65） Prior Publication Data

US 2011/0227754 A1    Sep. 22, 2011

Related U.S. Application Data

（60） Provisional application No. 61/312,934, filed on Mar. 11, 2010.

（51） Int. Cl.
*G06F 17/30* (2006.01)
*G06Q 50/06* (2012.01)

（52） U.S. Cl.
CPC .. *G06F 17/30412* (2013.01); *G06F 17/30489* (2013.01); *G06Q 50/06* (2013.01)

（58） Field of Classification Search
CPC ... H04Q 9/00; H04Q 2209/60; H04M 11/002; G01D 4/004; G01R 21/133; G06Q 50/06; Y02B 90/242; Y04S 20/322

(Continued)

（56） References Cited

U.S. PATENT DOCUMENTS

| | | | |
|---|---|---|---|
| 4,811,011 A | * | 3/1989 | Sollinger ................. G01D 5/39 340/870.02 |
| 6,035,285 A | * | 3/2000 | Schlect .................. G06Q 10/06 705/30 |

(Continued)

FOREIGN PATENT DOCUMENTS

| | | |
|---|---|---|
| WO | 03/084022 A1 | 10/2003 |
| WO | 2008/055098 A2 | 5/2008 |

OTHER PUBLICATIONS

International Search Report and Written Opinion for Application No. PCT/US11/28073, dated Oct. 18, 2011.

(Continued)

*Primary Examiner* — Laura Nguyen
(74) *Attorney, Agent, or Firm* — Nelson Mullins Riley & Scarborough LLP

（57） ABSTRACT

The present application is generally directed to mediums, methods, and systems for providing a data aggregator and reporting engine for utilities data. Exemplary embodiments provide procedures for aggregating and reporting data. According to exemplary embodiments, a base configuration for a data aggregator is provided. A variety of characteristics and functionality are built into the base configuration of the aggregator. Each characteristic may include a plurality of built-in options. By selecting one or more relevant options for each characteristic, a utility provider can build an aggregator that applies a custom profile to aggregate and report utilities data. The options may be selected prior to run-time, or may be selected at run-time. A dynamic reporting framework is also provided. The dynamic reporting framework allows for data aggregations to be calculated during the aggregation process without requiring that either the aggregator or the reporting framework be rebuilt or redesigned.

15 Claims, 10 Drawing Sheets

(58) Field of Classification Search
USPC ...... 340/870.01–870.03, 870.05; 702/61–62; 379/106.03
See application file for complete search history.

(56) References Cited

U.S. PATENT DOCUMENTS

| | | |
|---|---|---|
| 2003/0135339 A1 | 7/2003 | Gristina et al. |
| 2003/0229652 A1 | 12/2003 | Bakalash et al. |
| 2006/0217936 A1 | 9/2006 | Mason et al. |
| 2008/0140627 A1* | 6/2008 | Bossman .......... G06F 17/30306 |
| 2008/0301119 A1* | 12/2008 | Selvaganesan ... G06F 17/30563 |
| 2009/0094605 A1 | 4/2009 | Brelsford et al. |
| 2010/0117856 A1* | 5/2010 | Sonderegger ............ 340/870.02 |
| 2010/0117857 A1* | 5/2010 | Russell et al. ........... 340/870.02 |
| 2013/0311651 A1* | 11/2013 | Olsson .................. G06Q 10/06 709/224 |

OTHER PUBLICATIONS

International Preliminary Report on Patentability for Application No. PCT/US11/28073, dated Apr. 28, 2012, pp. 1-3.
European Search Report, EP 11712081.6, dated Jul. 11, 2016, 13 pages.

\* cited by examiner

METHODS AND SYSTEMS FOR DATA AGGREGATION AND REPORTING

RELATED APPLICATIONS

This application claims priority to U.S. Provisional Patent Application No. 61/312,934, entitled "Methods and Systems for Data Aggregation and Reporting" and filed on Mar. 11, 2010. The contents of the aforementioned application are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In the utilities industries, a large amount of data may need to be gathered, analyzed, and reported. It may be important that the data be generated and analyzed very accurately, because the data may be used to determine usage and/or billing amounts for utilities customers. Often, many points of data will exist for a single customer, which must be aggregated and analyzed. Further, data must be aggregated and analyzed at a macro level in order to apportion usage for common resources and analyze transmission losses.

For example, FIG. 1 depicts a high-level overview of a production, transmission, and consumption model for a utility, such as electricity. The utility for a particular area is generated or produced by one or more utilities providers 110, 112, 114. The utility is typically transmitted over common transmission mediums 120 in order to reach consumers 130, 140, 150. Because utilities are generally fungible and because they are placed on a common transmission medium, it is difficult or impossible to track the actual units of the utility (e.g., electrons in power lines). Although a utility provider may know how much of a certain utility the provider placed on the common transmission medium, the utility provider may not have accurate information about the utility once the utility leaves the provider's control.

Accordingly, utilities customers are often monitored to determine the amount of their utility consumption. For example, consumers may be provided with devices such as meters 132, 142, 152 that record utility usage over a period of time. By monitoring the meters 132, 142, 152, the utilities providers 110, 112, 114 can determine how much of the utility the consumers 130, 140, 150 used.

For example, if utility provider 110 provides a utility to two consumers 130 and 140, the provider 110 may check the meters 132 and 142 in order to determine how much of the utility each consumer 130, 140 consumed over a given period of time. If meter 132 shows that consumer 130 consumed 5 units of electricity and meter 142 shows that consumer 140 consumed 10 units of electricity, each of the consumers 130, 140 can be billed for the respective amounts of electricity consumed.

In most situations, there is not a one-to-one correspondence between the amount of a utility placed on the common transmission medium 120 by a utility provider and the amount of a utility retrieved by the utility provider's consumers. For example, some of the utility may be lost in transmission. Because each of the utility providers 110, 112, 114 will suffer some amount of transmission loss, the amount of loss must be apportioned between the providers 110, 112, 114 in order to ensure that each provider supplies an amount of the utility sufficient to provide for the requirements of the utility provider's customers. The difficulty in accounting for large amounts of a fungible utility in a common pool compounds attempts to accurately obtain and analyze information about the utility.

Different circumstances between and within geographical areas also make it difficult to obtain and analyze utilities data. For example, there are a number of different types of meters available, each of which may report usage data in a different way. Two examples of meter types are meters that report a scalar set of values and meters that use interval data recorders that record utilities information over a fixed interval. Different weather types affect rates of transmission loss, and different jurisdictions have different reporting requirements by which utilities providers must abide. Data may also be stored in different formats depending on the utility provider.

Practicality also complicates data collection, analysis, and reporting. A single utility provider may be associated with many hundreds of thousands of consumers. It may be difficult or impossible to accurately measure the amount of utility consumed by each consumer by regularly checking each meter. Instead, utility consumption is often apportioned based on a usage profile. Meter readings are taken at dispersed intervals, and the meter readings are applied to a profile that defines typical usage requirements and conditions. The profile may therefore provide an estimation of utilities usage based on limited data. Different utility providers use different types of profiles, and different profiles may be employed for different customers of a single utilities provider.

These complications can make data aggregation and reporting difficult. Typically, because of the wide variety of different local conditions and requirements, a data aggregation or reporting solution that works for one utility provider may not be adequate or even functional for another utility provider. Accordingly, custom data aggregation and reporting systems and software must often be created for each utility provider depending on the utility provider's unique needs. Generating these custom systems and software may require great time and expense.

Traditional data aggregation implementations typically follow standard implementation patterns. An implementation team gathers and consolidates requirements, analyzes those requirements in order to develop a project plan, and works through design, development, testing, migration, and post-production phases of the plan. While this process allows for custom solutions that are tailored to the specific needs of each client and project, the process generally requires a lengthy implementation time before arriving at a solution.

SUMMARY

Exemplary embodiments described herein provide a customizable data aggregator and reporting engine. Accordingly, an effective aggregation and reporting implementation can be quickly deployed and fully customized to the particular requirements of a utility provider. Further, the aggregator employs a flexible framework so that additional aggregation characteristics can be added to the aggregator at a later time.

Exemplary embodiments provide procedures for aggregating and reporting data. According to exemplary embodiments, a base configuration for a data aggregator is provided. A variety of characteristics and functionality are built into the aggregator. Each characteristic may include a plurality of built-in options. By selecting one or more relevant options for each characteristic, a utility provider can build an aggregator that applies a custom profile to aggregate and report utilities data The options may be selected prior to run-time, or may be selected at run-time. Whereas conventional aggregators apply a fixed, custom set of calculations to collected data, exemplary embodiments of the present aggregator select one or more calculations from among a plurality of calculations. The selected calculations may be dependent on one or more characteristics of data that is accessible to the aggregator.

A dynamic reporting framework is also provided. The dynamic reporting framework allows for data aggregations to be calculated during the aggregation process without requiring that either the aggregator or the reporting framework be rebuilt or redesigned.

DETAILED DESCRIPTION

Figure 1:
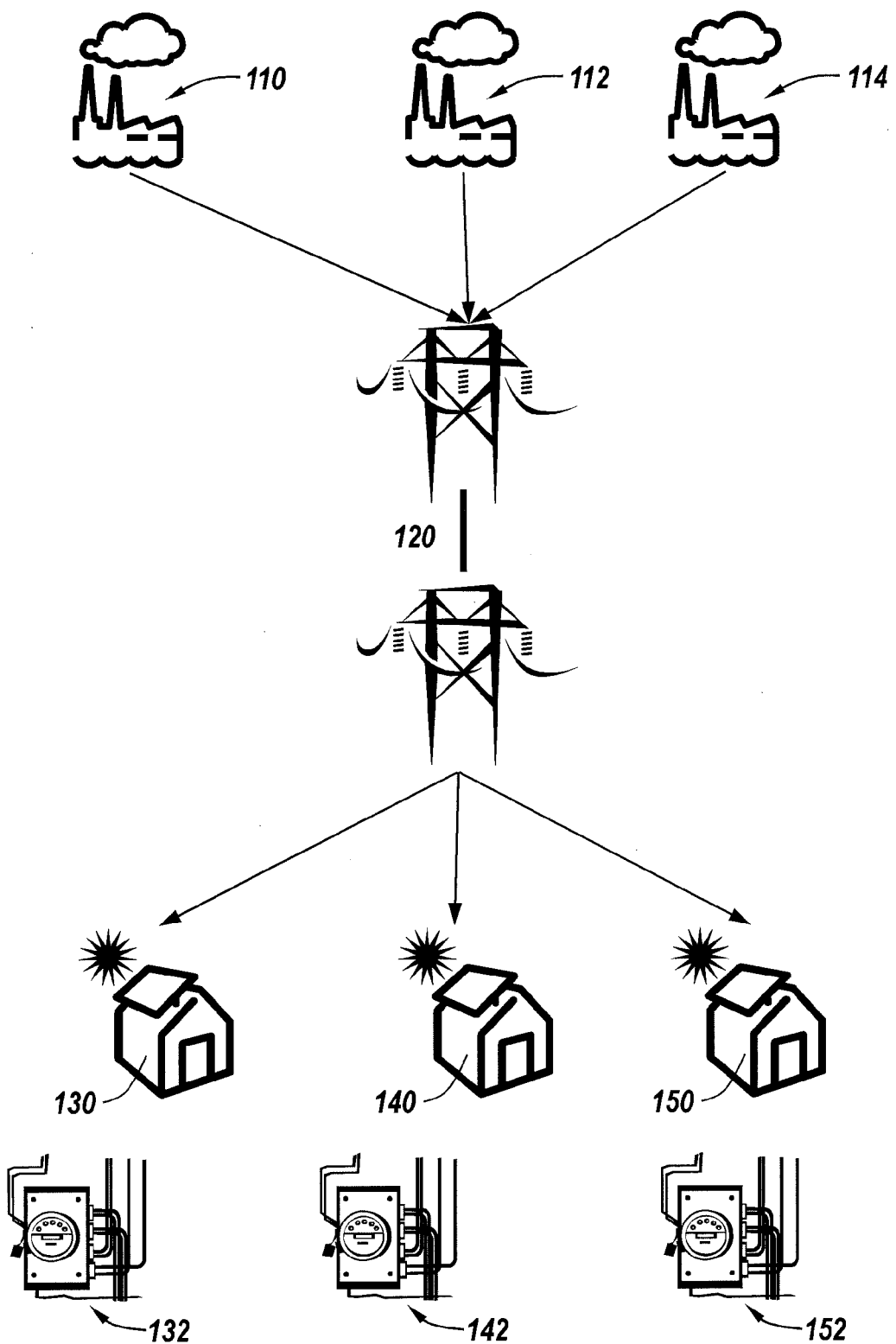
FIG. 1 graphically shows a high-level overview of a production, transmission, and consumption model for a utility.

The present application provides a flexible, extensible, and customizable data aggregation and reporting mechanism which can be quickly deployed without customized coding, but which provides the aggregation and reporting capabilities used by disparate utilities providers to aggregate and report data. The aggregator includes a base configuration which allows a user, such as a utilities provider, to specify reporting requirements for their particular needs. Because the aggregator and the reporting framework have access to the base configuration and the values specified by the utilities provider, the data can be aggregated and a report can be generated without the need to rebuild or redesign either the aggregator or the reporting framework for each individual utilities provider.

Terminology

As used herein, the term "optimized" includes improving the performance or efficiency of an operation, although the actual performance or efficiency of the operation need not be the best or optimum possible. The term "minimized" includes reducing the size or amount of a quantity involved, although the actual size or amount need not be reduced to the minimum possible. The term "maximized" includes increasing the size or amount of a quantity involved, although the actual size or amount need not be increased to the maximum possible.

Electronic devices include the mechanical, magnetic, electronic, and electrical devices forming a computer or other electronic system. Electronic devices include, but are not limited to, computers, peripherals, measurement devices, meters and acquisition systems. Measurement devices, acquisition systems, and meters include instruments and devices that generate an input or output to facilitate the collection of measurement information. Measurement devices may obtain and compare physical quantities or characteristics related to objects and events. Measurement devices may include, for example, sensors (such as temperature sensors, pressure sensors, and tactile sensors), diagnostic devices, rangefinders, voltmeters, flow meters, speedometers, accelerometers, force gauges, strain gauges, barometers, dynamometers, ballistic pendulums, and the like.

A utility, as used herein, is a good or service provided by a utilities provider and consumed by one or more consumers. Utilities may include electricity, natural gas, water services, sewage services, sanitation services, telephone and internet service.

A campaign, as used herein, refers to a promotion or discount offering. For example, a campaign may involve applying a discount rate to the rate charged per unit of a utility consumed.

Data includes information or collections of information that represents qualitative or quantitative attributes of a variable or set of variables. Data is typically the result of a measurement and therefore may be gathered from one or more measurement devices. Data may refer to any type of machine-readable information having substantially any format that may be adapted for use in one or more networks and/or with one or more devices. Data may include digital information or analog information. Data may further be packetized and/or non-packetized. Data streams include sequences of units of data which may or may not be related, and which may be arranged, for example, by time.

In order to acquire data or interact with a database, a system may use one or more stored procedures. As used herein, a "stored procedure" is a subroutine available to applications accessing a relational database system. Typical uses for stored procedures include data validation and access control mechanisms. Furthermore, stored procedures may be used to consolidate and centralize logic that was originally implemented in applications.

Data may be aggregated. As used herein, aggregation means analyzing data to draw conclusions from the data, collect related or relevant data, combine the data into a new representation, or summarize the data. If the data is combined into a new representation, the new representation may be smaller in size than the original data.

"UFE," as used herein, means "unaccounted-for-energy." Unaccounted for energy includes energy that is placed on a transmission medium at an entry point but which is not accounted for at some location downstream of the entry point. Unaccounted for energy may be caused by transmission losses in the transmission medium. For example, one traditional definition for UFE the sum of all generation in the UFE zone minus the sum of all transmission loss-adjusted load in the same UFE zone.

"TDSP," as used herein, refers to a Transmission and Distribution Service Provider.

"TOU," as used herein, is a Transmission Operating Unit.

"LMP," as used herein, means Locational Marginal Pricing.

"QSE," as used herein, means Qualified Scheduling Entity.

"IDR," as used herein, means an Interval Data Recorder or an Interval Data Recording.

"LLS," as used herein, means Lowest Level Summary. The lowest level summary is a summary based on a low level characteristic. Examples of low level characteristics include unadjusted load, distribution-adjusted load, transmission-adjusted load, UFE-adjusted load, and allocated UFE without load.

"Profiles" include templates and structures that may be applied to data in order to extrapolate information. A profile may take into account a variety of factors in order to allow a provider to extrapolate usage information related to a customer to whom a profile is applied. "Extrapolation" involves inferring values for a variable or variables in an unobserved interval based on values within an observed interval.

A data aggregation procedure, data aggregation process, or data aggregation run refers to the steps that are taken in order to aggregate data.

Exemplary Embodiments

Exemplary embodiments provide methods, systems, and electronic device readable mediums storing electronic device readable instructions for aggregating data and reporting information related to the data. According to exemplary embodiments, an aggregator for retrieving and analyzing data may be provided. The aggregator may be configured using a plurality of settings, each setting accepting one or more values, the plurality of settings together describing a configuration of the aggregator. The data may be aggregated during an aggregation run, and the aggregator may be configured at a run-time of the aggregation run Whereas conventional solutions provide an aggregator with a fully custom-built or fully predefined configuration depending on local practices, exemplary embodiments provide an aggregator that may be configured by specifying values for the settings. The values may be modified to specify a different configuration of the aggregator. The settings may include, for example, one or more of a retailer identity, a distribution company, a meter type, a weather sensitivity, a weather zone, a profile type, a TOU type, a loss class, location information, and campaign information The aggregator may access data related to the provision of a utility, such as electricity or natural gas. Based on the values provided for the settings, the data may be aggregated. The data may be stored in one or more databases maintained by a utility provider. The database may be managed with database software. In some embodiments, aggregating the data may involve applying a profile to the data that allows information regarding an unobserved time period to be extrapolated from the data.

The aggregator is an extensible data aggregation and reporting solution adaptable to multiple markets and requirements. The aggregator may be user-configurable for a variety of common market variances, such as calculations and reporting. The aggregator system is designed to scale between scalar and interval customers, between various markets and market requirements, and between small and very large databases.

Based on the aggregation, a report may be generated that summarizes the aggregated data. Accordingly, the aggregator system may further include a dynamic reporting framework. The dynamic reporting framework allows for user-configurable aggregations to be calculated during the aggregation process without requiring new computer code. Any combination of populated aggregation characteristics can be aggregated at the unadjusted, distribution adjusted, transmission adjusted, UFE adjusted load, or allocated UFE only (e.g., without the load) levels. Any report can be scaled or rounded as specified in a reporting table.

The report may be customized based on one or more of the values provided for the aggregator settings. Unique or custom reports can be developed and configured at any time. The reporting may be data driven, such that the data available to the aggregator determines one or more reporting options. For example, if the data available to the aggregator indicates that utilities are provided in a particular jurisdiction, the reporting framework may recognize the jurisdiction and generate reports based on jurisdictional requirements.

Figure 2A:
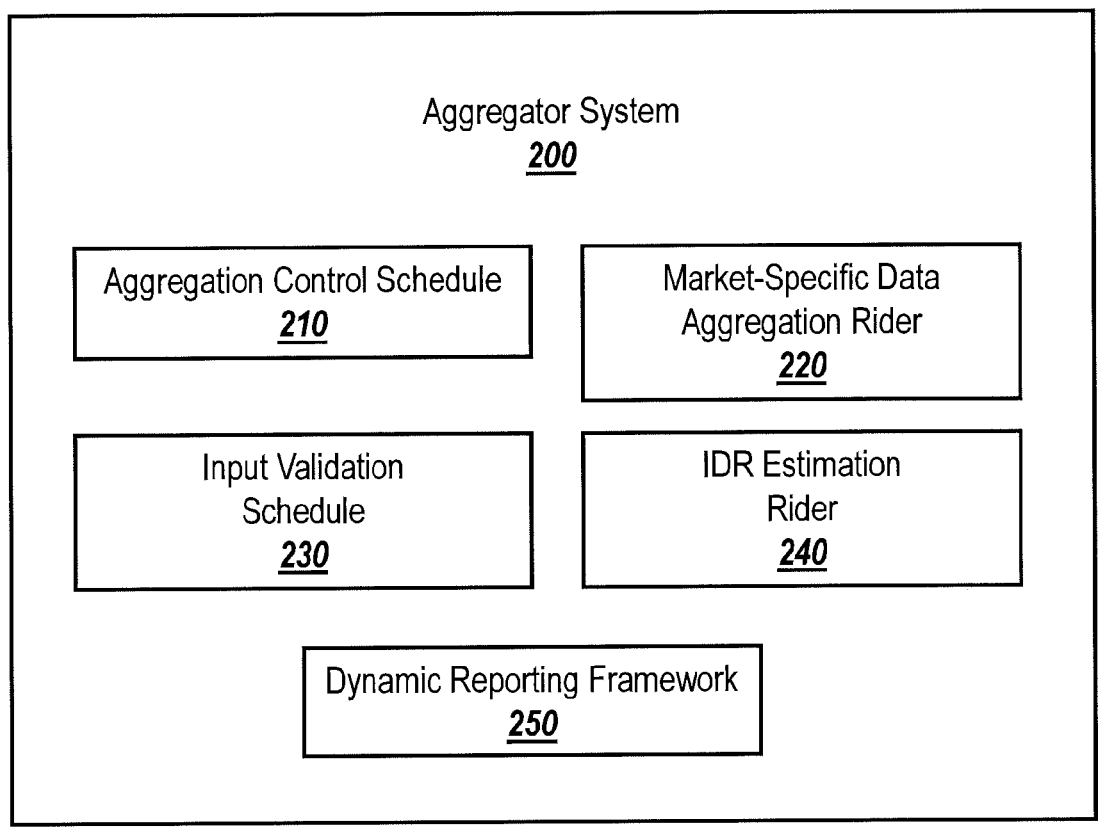
FIG. 2A depicts an aggregator system 300 according to exemplary embodiments.

An exemplary aggregator system 200 for aggregating data, analyzing the data, and reporting information related to the data is depicted in FIG. 2A. The aggregator system 200 may include an aggregation control schedule 210. The aggregation control schedule 210 is the control schedule for the data aggregation process. The aggregation control schedule 210 verifies that input variables are valid and reports any problems that arise during the aggregation process. The aggregation control schedule 210 creates an output directory and selects an appropriate data aggregation rider (described below) for the market selected. Upon completion of the data aggregation process, the aggregation control schedule 210 generates a code profile in the output directory to allow after-the-fact analysis of performance and trends.

The aggregator system 200 may further include a market-specific data aggregation rider 220. The core data aggregation calculations may be performed in the market-specific data aggregation rider 220. Each market-specific data aggregation rider 220 may be cloned from the aggregator 200 and modified if necessary for a particular market and/or utility provider's needs. Each market-specific data aggregation rider 220 performs a number of steps and calculations and calls additional riders and schedules as needed.

The aggregator system 200 may include built-in data aggregator functionality. For example, the market-specific data aggregation rider may perform any or all of the following functions: pre-aggregation of scalar reads; estimation and aggregation of interval customers; profile application; distribution and transmission loss application; UFE calculation and allocation; user-configurable dynamic reporting; comma separated value (CSV) output of reports and aggregations; and peak load contribution and service point count aggregation.

Data can be aggregated by the market-specific data aggregation rider 220 using a number of characteristics. For example, the characteristics may include, but are not limited to: information regarding a retailer and/or scheduler; a distribution company; a profile class, which may include information regarding meter type (e.g., scalar or IDR), weather sensitivity, weather zone, profile type, and TOU Type; a loss class; location-related information which may include LMP/Settlement Point information and information related to a UFE Zone; information relating to a campaign;

and information related to a method, which involves a generated value that identifies how a particular segment was calculated or estimated. Additional aggregation characteristics can be added to the system at any time. Accordingly, the aggregator system 200 (and accompanying reporting framework) is extensible with custom settings.

Calculations may be customized as desired, for example by providing a loss factor application methodology, IDR estimation methodology, and/or UFE allocation methodology.

Any available service point consumption and characteristic data may be used to drive or control the data aggregation process through the market-specific data aggregation rider 220. The operations of the market-specific data aggregation rider 220 are described in more detail with reference to FIG. 4, below.

The input validation schedule 230 loads and validates any input variables. For example, the input validation schedule 230 may load interval data for each profile class for an entire profile window. The profile window is calculated by retrieving various factor values for profiles. These factor values are used to calculate the earliest and latest dates that the process should profile. Each profile is evaluated for missing intervals. If any intervals are found missing during the process, the dates of the gap are determined. The system continues processing all input data and reports at the end of the schedule with a list of outstanding input data problems, including a list of profile classes with missing data periods specified. If the market requires TOU profiling, TOU profile segments may be created. Profile data characteristics, including TOU type, weather sensitivity, meter type, weather zone, and profile type, are stored in a profile array for access by the main process.

The input validation schedule 230 may retrieve loss factors and interval loss data from a database for a specified trade date. Any missing factors or interval data with missing intervals may be reported. If any missing data was found, the process may abort with a report identifying the missing data. For markets with non-proportional UFE allocation, UFE allocation factors may be retrieved from the database by the input validation schedule 230. Any missing factor may cause a report of the factor missing and an abort.

Further, the input validation schedule 230 may retrieve Data Aggregation Reports records active for a specified operating date, and may store the records in an array in memory for access by the data aggregation process. The array may contain data elements from the Data Aggregation Reports table. For reports with custom reporting elements, elements may be retrieved from a database and stored in an array for custom reports. Any reporting variables may be reported to the Rules Language report for review.

An IDR estimation rider 240 may be used to estimate usage characteristics for an interval data recorder and aggregate interval data recorder data together. The IDR estimation rider 240 may be run asynchronously from the main aggregation process to allow for parallel processing and performance.

IDR records may be processed by the IDR estimation rider 240 based on a determination of whether the service point will be processed using its own data or a default class profile. The process attempts to load interval data for the proxy day on the staging record for non-default profile methods. The proxy days are selected during the population of the staging table in the data aggregation procedure. That process picks the proxy day with an available interval meter read. If that data is unable to be retrieved or has missing intervals, the default profile may be retrieved from memory and substituted. An error message may be generated describing the nature of the error.

Based on the aggregation performed by the aggregation system 200, a report may be generated that summarizes the aggregated data. The report may be customized based on one or more of the values provided for the aggregator settings. Accordingly, the aggregation system 200 may further include a dynamic reporting framework 250, or the dynamic reporting framework 250 may be provided separately from the aggregation system 200. The dynamic reporting framework 250 allows for user-configurable aggregations to be calculated during the aggregation process without requiring new computer code. Any combination of populated aggregation characteristics can be aggregated at the unadjusted, distribution adjusted, transmission adjusted, UFE adjusted load, or allocated UFE only (e.g., without the load) levels. Any report can be scaled or rounded as specified in a reporting table.

The reporting system may allow the output of the reports to be directed to comma-separated value (CSV) files and/or saved into particular database tables. A load ratio share option allows Load Ratio Share ("LRS") calculations to be performed during the reporting process.

Figure 2B:
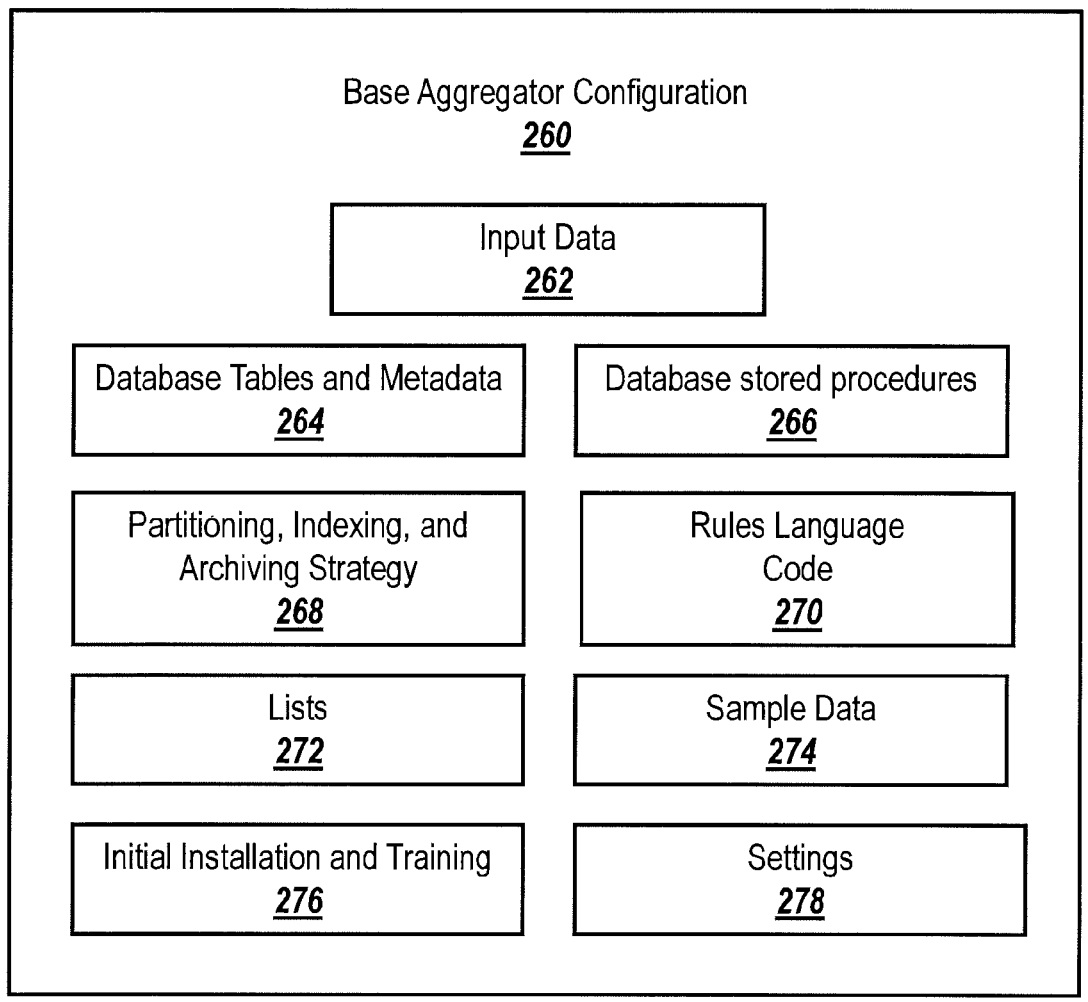
FIG. 2B depicts a base aggregator configuration 200 according to exemplary embodiments.

In order to aggregate and report the data, the aggregator system 200, including the reporting framework 250, may be deployed with an exemplary base aggregator configuration, such as the exemplary base aggregator configuration 260 depicted in FIG. 2B.

As shown in FIG. 2B, the base aggregator configuration 260 may include input data 262. The input data includes basic utility provider information that allows the aggregator system 200 to be configured and to process data. The input data 262 may include a number of values for input variables that are used to determine how an aggregation run should proceed. It should be noted that the input data 262 is different from the data to be aggregated. The input data 262 may describe a configuration of the aggregator, and the aggregator may use the input data 262 to aggregate utilities data, such as utilities data stored in a database or utilities data collected in real time. For example, the input data 262 may specify that the utilities data is coming from Interval Data Recorders (IDRs), and the input data 262 may be used to configure the aggregator to accept utilities data from customers in a format appropriate for IDRs.

Exemplary input variables for the input data 262 may include, but are not limited to, the market for the aggregation run (e.g., Southwest Region, etc.), the commodity for the market (e.g., E—Electric, G—Gas, etc.), the day to be aggregated, the type of proxy days to be used for the interval estimation (e.g., normal, forecast, etc.), the number of parallel interval estimation and aggregation jobs to spawn (to allow for scalable performance in markets with high levels of advanced metering), and whether or not UFE calculations should be used or skipped.

Although exemplary embodiments are described with reference to particular variables and implementations, one of ordinary skill in the art will understand that the present invention is not limited to the particular embodiments described. For example, more or fewer input variables may be utilized in the input data, and the input variables may have more or fewer values which may be applied to the input variables. A value need not be specified for every input variable. If a value is not specified, a default value may be used.

The input data 262 may be stored in one or more database tables 264 that store variables and characteristics used during the data aggregation process. The database tables 264 may store, for example, customer and usage data, global data, factors, profiles, configuration options, and ancillary data used in the data aggregation process. Metadata may be associated with database tables 264, and tables and metadata may be used in the data aggregation process. Exemplary database tables 264 are described below.

A data aggregation run table may be created at the beginning of each data aggregation run. The data aggregation run table may store input options used to execute the data aggregation run in order to determine how a particular process was executed and generate an expected output. The data aggregation run table may uniquely identify each execution of a data aggregation run. The data aggregation run table is used to identify the characteristics of the execution and to ensure no subsequent execution confounds existing data. The data aggregation run table is used to prevent two runs with identical characteristics from proceeding without either first removing the initial run or executing the second run with the option to delete previous runs. The data aggregation run table may include an option to lock a data aggregation run by publishing it. This prevents the run from being overwritten by an accidental subsequent run.

Custom report tables may be used to modify a data aggregation report to allow ad hoc addition and subtraction of elements from a report. The custom report table may identify custom groups of data to report or exclude from reporting for a particular execution of the process. A custom report table may identify entities that should be included/excluded from an aggregation run using a custom report. The custom report table may be "effective date" driven, allowing for a particular custom report to include or remove elements over time while maintaining a history of those inclusions or exclusions. An "effective date" is the date or dates when the fields in a record are valid. For example, a record may have start and stop times, with the effective date being any moment between the start time and the stop time.

A loss class table may be used to identify how to calculate losses, such as by specifying loss classes used to adjust a consumption load. The loss class table may include one or more fields, such as a loss type field. The loss type field is used to identify what type of loss factor calculation should be used for a particular loss class. Typical loss types include interval and factor calculations, depending on the data aggregation requirements of a particular aggregation run.

A run history table may be used to store run characteristics and timings for each executed aggregation run. Each run may be split into various sections to assist in identifying where a run may encounter data that may cause the run to abort. Detailed execution times for each run may be recorded. This data can be used to determine trends in run times of the entire run or each individual section, providing the capability to proactively identify performance-tuning opportunities.

A provider table may store information about transmission and distribution service providers.

A profile class table stores a class profile and associated characteristics, including profile type, weather zone, weather sensitivity, meter type, and TOU type. A profile type table may be used by the profile class table to identify a type of profile. This may not be different than the profile class in some markets, but in those markets where the profile class is a combination of characteristics, the profile type table can be used to identify the profile family.

A weather zone table may be used by the profile class to identify the weather zone for a profile class.

A location table may be used to identify a location for a service point in an aggregation run. A location code may be mapped to higher level characteristics, including UFE zone, settlement point or LMP node. A UFE zone table may store secondary aggregation characteristics for markets where the location code is at a more granular level. The UFE zone table may be used to identify the level at which UFE calculations are performed. The aggregations are compared to a sum of the system load at the UFE zone level.

A settlement point table may be used to identify settlement points or LMP zones where certain market characteristics and calculations are performed. The settlement point table may store secondary aggregation characteristics for the location code.

A campaign table may be used to identify campaigns or deals used to acquire customers. This table allows aggregation and reporting by deal, allowing for analysis of the relative value and profitability of each deal.

A location mapping table may be used to map the service point level location to higher-level attributes, including UFE zone, settlement point, market, and TDSP. This table may be "effective date" driven allowing for the location mapping to change over time.

A data aggregation report table may be used to configure aggregation reports. Any record active in the table for the trade date being aggregated may be included in the reporting section for that trade date. Each report may have a unique name to identify the report. The report can be scaled to the desired interval length and rounded to the desired decimals.

Each report may have a source array, typically one of the five lowest level summary arrays (e.g., unadjusted load, distribution-adjusted load, transmission-adjusted load, UFE-adjusted load, or allocated UFE without the load).

Each aggregation characteristic may have a flag that identifies whether it will be included in the aggregation. For example, if a user desires an aggregation of UFE-adjusted load by TDSP and weather zone, the user may set those two flags to "Y" and leave all other flags as "N". Possible aggregation groups include the lowest level summary characteristics (market, retailer, TDSP, location, profile, loss, QSE, UFE zone, Settlement point, campaign, and method), as well as sub-characteristics for the profile used in the specific regional market, such as the Southwest market (e.g., profile type, weather zone, meter type, weather sensitivity, and TOU type). A "save location" option may identify a table where the interval data should be saved. A field may identify any custom report exclusions or additions.

A report format table may be used to identify valid report formats for the data aggregation reports table.

A scalar staging table may be used to store the output of the data aggregation pre-aggregation stored procedure for scalar service points. All service points with the same aggregation characteristics for the trade date and the same meter read start and stop times may be aggregated into these staging records for profile application. These records include TOU periods, sum of capacity factors, and a count of service points included in the record where appropriate.

An IDR staging table identifies each interval customer active for the trade date and its associated aggregation characteristics. It also includes the proxy day to be used for the service point for the day. The proxy day is determined in the procedure by ranking the available data for the service point, looking first for metered data for the trade date, then looking for weather sensitive proxy day data where the service point is weather sensitive and the market performs weather sensitive proxy day selection, then looking for similar days in the past. The table also identifies the parallel processing group that will be used to process the record (selected to ensure that all service points in the same aggregation group are processed by the same parallel process). The record includes the sum capacity factor where needed.

A proxy day table identifies the proxy days for each operating date to be used by the aggregation stored procedure to identify which days to load for interval customers.

In addition to the tables 264, the base aggregator configuration 200 may further include database stored procedures 266. A stored procedure is a procedure available to applications accessing a database system, such as a relational database system. Exemplary stored procedures are described below with reference to FIG. 4.

The exemplary base aggregator configuration 200 includes a partitioning, indexing, and archiving strategy 268. The partitioning, indexing, and archiving strategy 268 may provide information relating to the partitioning, indexing, and archiving of data, including data maintained in a database. Because utilities data is often complex, detailed, and large, an aggregator needs to perform well in very large and complex environments. Accordingly, the partitioning, indexing, and archiving strategy 268 provides a framework for efficient and ongoing database maintenance to ensure that the aggregator maintains efficient performance in the long term. For example, large tables may be partitioned to ensure that the demands of a production system do not limit the ability to perform partitioning and maintenance.

Moreover, large tables with effective-dates may be partitioned based on a stop time. This permits the effective archiving and removal of old data, without affecting data that may still be required in the system. The partitions may be monthly or quarterly, depending on the table and the table's expected size and growth rate. Older partitions can be moved to slower tiers of storage in order to keep the most active data on the fastest tier of storage.

Where appropriate, local indexes may be utilized to allow faster partition pruned queries and easier archival and removal of old data. Local indexes allow for more effective deletion or truncation of older partitions without massive index rebuilds. The number of global indexes required may be reduced as compared to a traditional implementation where partitioning, indexing, and archiving are not considered until the database is very large and experiencing performance degradations.

Queries from the system may be designed to allow partition pruning, which can significantly improve the performance of the queries and lower the overall I/O. Partitioning may prevent end-user-generated run-on queries from adversely affecting other queries. For example, since effective-date driven records should go forward in time (i.e., the start time is always less than stop time), any query that looks for records with a start time greater than a certain date can be made significantly more efficient by adding a second clause that ensures the stop time is also greater than that certain date. Certain database implementations may then be able to ignore all partitions prior to the specified date, significantly shrinking the amount of I/O required to return relevant records.

The partitioning, indexing, and archiving strategy 268 further may provide performance and operations reporting. For example, a Run History table stores detailed performance metrics on each section of the code. This allows for the ongoing monitoring of performance trends and the efficient identification of the drivers of those trends. Each process also may produce a code profile that shows the timings of each line of Rules Language code to identify any lists or I/O operations that may require additional attention. The source of any unexpected performance degradation can be immediately identified without requiring special runs, which in a performance compromised state could require a significant amount of time.

The exemplary base aggregator configuration 260 further includes Rules Language Code 270. Rules Language Code includes Lodestar Programming Language code that may be used in conjunction with, for example, Oracle databases.

The exemplary base aggregator configuration 260 further includes one or more lists 272. Lists, as used herein, include stored queries for accessing and obtaining information from a database.

The exemplary base aggregator configuration 260 may also include sample data 274 and installation and training information 276 in order to facilitate the installation and use of the aggregator.

The base aggregator configuration 260 provides a number of settings 278 which may accept one or more values. The values may be specified using, for example, the input data 262. The combination of values for the settings 278 describes a configuration for the aggregator 200, and the aggregator 200 may accept different values for the settings 278 to generate different configurations. In this way, the base configuration 260 may be deployed in the network of a utility provider, and the utility provider may use the aggregator 200 without the need to rebuild the aggregator 200 or write new code. The base aggregator configuration 260 is extensible so that new settings 278 may be added.

Figure 3:
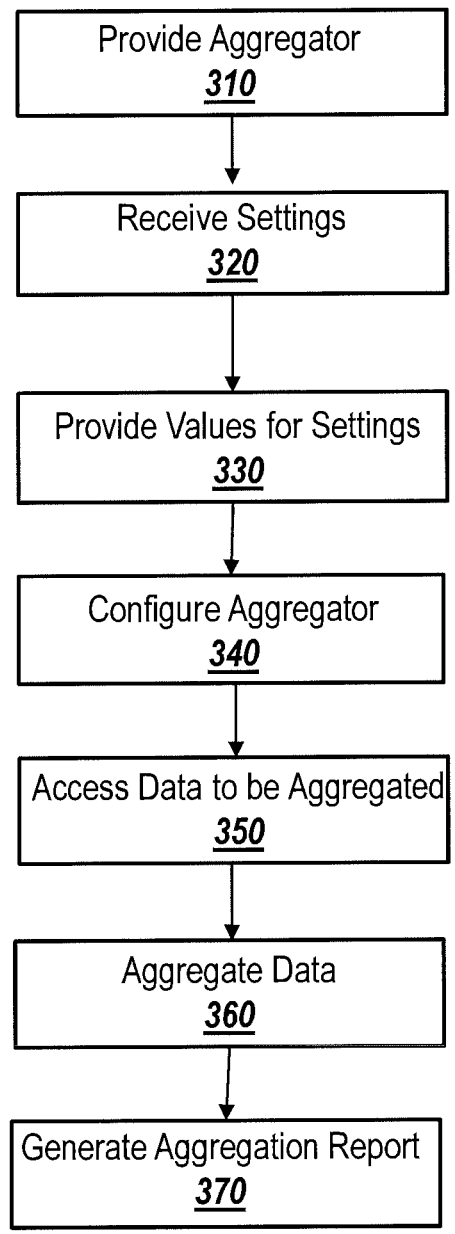
FIG. 3 is a flow chart depicting an exemplary procedure for aggregating and reporting data.

FIG. 3 depicts an exemplary method for using the aggregator 200 and the dynamic reporting framework 250 to aggregate and report data.

At step 310, the aggregator is provided. The aggregator may be provided on an electronic device accessible to a utilities provider, either locally or through a network. The aggregator may be encoded on one or more non-transitory electronic device readable media storing instructions that, when executed, cause one or more processors of the electronic device to provide the aggregator.

At step 320, settings for the aggregator may be received. The settings may take one or more values which describe a configuration of the aggregator. In order to receive the settings, the aggregator 310 may be deployed with a base aggregator configuration 260. This may be done when the aggregator is first deployed or installed, or any time thereafter.

At step 330, values may be provided for the settings. In some embodiments, the values may be specified by a user through a user interface. In other embodiments, values may be specified for the settings by saving the values in a configuration file which is accessed by the aggregator 200. If a value is not specified for a setting a default value may be used. Alternatively, values may be specified in a combined manner by providing a configuration file, and any values not specified in the configuration file may be specified by a user through a user interface. Two exemplary interfaces for specifying values are described in more detail with reference to FIGS. 6A and 6B, below.

At step 340, the aggregator 200 may be configured using the values specified at step 330. For example, the values may be applied to the settings in a memory of the electronic device.

At step 350, the aggregator 200 may access data to be aggregated. The data may be provided in one or more databases, may be entered into the aggregator manually or stored on an electronic device readable medium, or may be gathered in real time, among other possibilities.

At step 360, the data may be aggregated. Data aggregation is discussed in more detail with respect to FIGS. 4A, 4B, and 5 below.

At step 370, the dynamic reporting framework 250 may generate an aggregation report. The aggregation report may be generated based at least in part on the values provided at step 330, so that the report may be consistent with the aggregation. The aggregation report may provide a summary or analysis of the data. The aggregation report may be presented to a user through a graphical user interface, sent to a peripheral such as a printer, or stored for future use in a memory of the electronic device.

Figure 4:
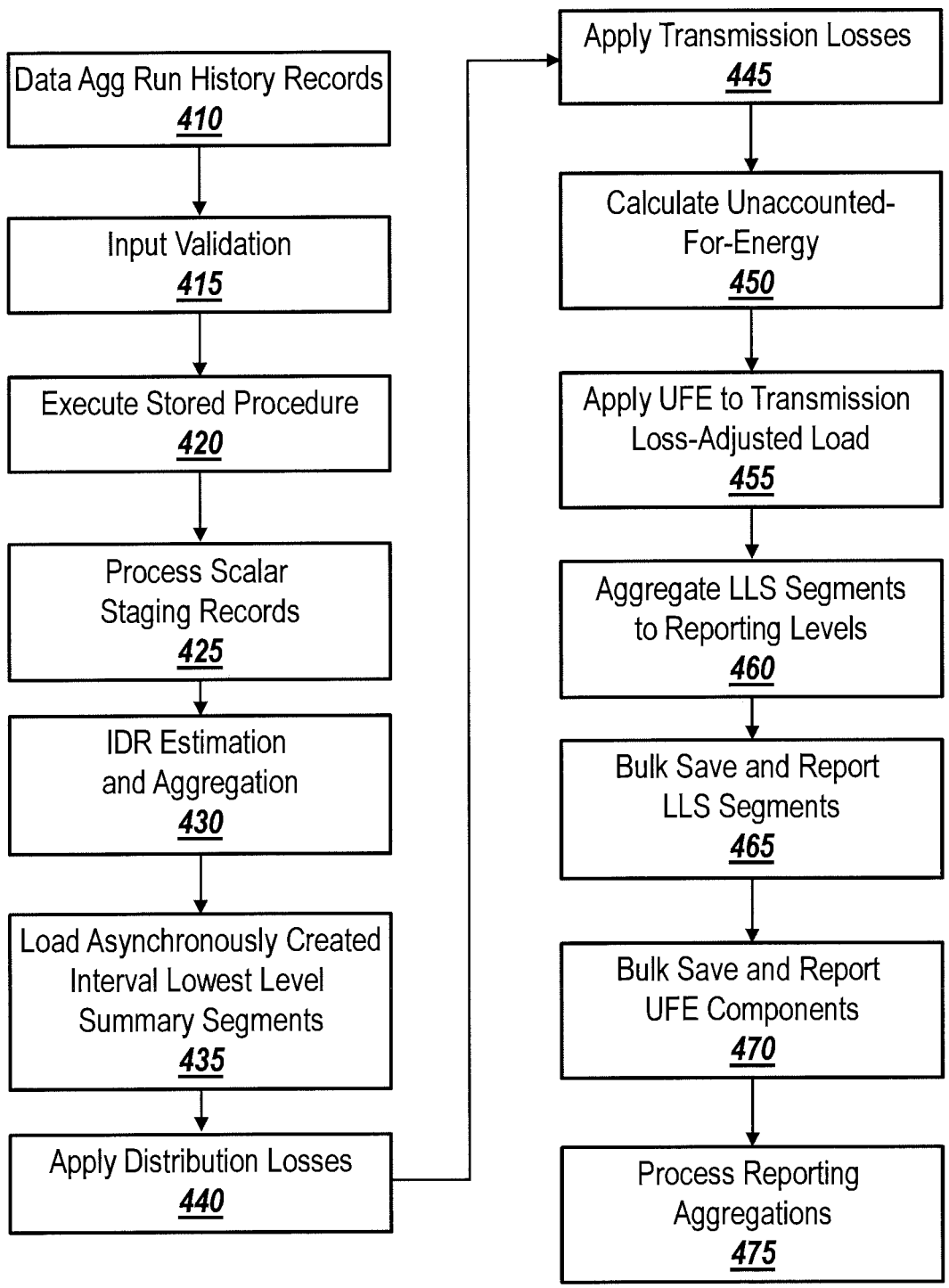
FIG. 4 is a flow chart depicting an exemplary procedure for performing core data aggregation calculations.

Returning to the procedure for aggregating the data, as noted above the market-specific data aggregation rider 220 (see FIG. 2A) performs core data aggregation calculations. Each instance of a market-specific data aggregation rider 220 may perform a number of steps and calculations and calls additional riders and schedules as needed. An exemplary procedure performed by the market-specific data aggregation rider is depicted in FIG. 4.

At step 410, the market-specific data aggregation rider inserts and updates records in the Run History table to identify the current location of the process, record timings, options, and errors, and provide a source for analysis, both for a particular run and for longer term trends. Upon initiation of the process from the aggregation control schedule, the market-specific rider first creates a Run History record for the entire process. At the completion of the process, this record is updated with a status of "COMPLETE" which completes the timing of the run and performs the final update of the record. If the process encounters an abort condition or doesn't complete normally, the currently executing section may be stored for future review.

In addition, sections of the code run by the aggregator and stored procedures may create Run History records at a granular level, which allow for the detailed analysis and determination of the operations of the run. Each section in the Rules Language and each query in the aggregation stored procedure may create a Run History record and timing for that run. This granularity also functions well as a guide for discussing the functionality of the system in a systematic way.

At step 415, the data aggregation rider 220 calls the input validation schedule to load and validate all required input data, including profiles, loss factors, dynamic reports, and any other data necessary for the successful execution of the schedule outside the service point usage. This may be a schedule rather than a rider to allow a user to execute the schedule prior to, for example, retiring home for the evening to ensure that all input data will be available for a nightly process. Upon completion, any necessary input parameters may be available in memory for the remainder of the process.

At step 420, the data aggregation process executes stored procedures, potentially leveraging database capabilities to perform massive set operations efficiently. Upon completion of a stored procedure, the system validates that the procedure completed successfully and that there are at least one scalar and one interval metered service point active for the operating day. If the procedure does not complete normally or the required number of active customers is not found, the process may abort with an appropriate message.

At step 425, the data aggregation process may retrieve the scalar staging records and profile them according to meter-type, TOU-type, and method fields associated with the records.

The meter type field identifies whether the service point is a traditional scalar customer. The scalar staging table typically only contains scalar service points. However, in a market with Automated Meter Reading ("AMR"), there may be data that does not arrive from the same source location or needs special processing. Data requiring special processing can be identified and handled appropriately, or alternatively the procedure may abort when any of such records are found until they can be analyzed and appropriately handled.

The TOU type field from the profile code relationship determines whether that profile class should be TOU profiled or traditionally profiled.

The method field determines how that particular aggregate group should be profiled. Profiling methods may involve service points with actual data for the operating day, those with no current data, but usable historical data, and those with no available data.

In order to use the appropriate profile data for the usage factor calculations in the profile application process, each staging record may be aggregated by the lowest level summary characteristics and the start and stop times of the meter reads. The dates of the usage records may be used to ensure that the usage factor applied to the class profile is calculated from the same period of time.

At step 430, IDR estimation and aggregation may be performed. The interval data estimation and aggregation process may run asynchronously from the main procedure. The IDR estimation and aggregation procedure may load actual or estimated data for each interval metered service point active for the operating day. The IDR estimation and aggregation procedure aggregates interval data to the lowest level summary segment and saves the aggregated data for retrieval by the main process. This process may run in parallel. This allows the solution to scale as the number of interval metered service points increase.

An initiating process waits until the completion of each spawned process and determines if that process completed successfully by retrieving the data aggregation run history record for each child process. If any have failed, the entire process may abort with a notification of which child process failed to successfully complete.

At step 435, the aggregation system may load asynchronously created interval lowest level summary segments. The system may retrieve LLS segments created during the IDR estimation process and append them to an LLS unadjusted load array in memory. Upon completion of this process the LLS unadjusted array is complete, having both scalar service point aggregations from the profile application section and interval metered service points from the interval estimation and aggregation section.

At step 440, distribution losses may be applied. At this point, all loss factors may have been previously loaded into memory during the input validation process. The solution has been configured with interval and scalar loss factors. Each loss class has a loss type field that determines how that loss type is calculated. Typical loss calculations include basic factors, factors requiring different formulas (1/1-loss factor, etc.), basic interval losses, and interval losses requiring different calculations. Additional loss methods can be customized into the template for any market or distribution company with more complex calculations.

Each record in the LLS unadjusted array is retrieved from memory along with the loss for that particular aggregation. The appropriate loss factor and calculation type is retrieved from memory and applied to the segment to arrive at a corresponding cut in the LLS distribution loss adjusted array. If the matching loss factor or interval data is missing from memory, the system writes a warning and aborts. This indicates that a scalar or interval segment was created without interval data, which should not occur.

The array indexes are synchronized between lowest level summary arrays. No distribution loss is applied for transmission metered service points and service points exempt from distribution losses. The distribution loss adjusted lowest level summary load for those segments is identical to the unadjusted load (loss factor of 0%).

At step 445, the system may apply transmission losses. Transmission loss-adjusted load for each lowest level summary segment is calculated by applying transmission losses to the distribution loss-adjusted load for the segment. Segments exempt from transmission losses are assigned the values from the distribution loss adjusted segment. Transmission losses can be calculated using a factor or interval data. The rider for each market may include a variable that is used to identify the type of transmission loss calculation used. Complex calculations can be customized as needed.

Upon calculation of the transmission loss-adjusted segment, a number of aggregations are calculated for UFE application. Those include the sum of transmission loss-adjusted load by UFE zone and by UFE allocation group within the UFE zone for markets with non-proportional UFE allocation methods.

At step 450, the system may calculate Unaccounted For Energy. UFE is traditionally defined as the sum of all generation in the UFE zone minus the sum of all transmission loss-adjusted load in the same UFE zone. In order to calculate UFE, it may be necessary to acquire information related to these two values. Retailers and other market participants in markets without this information can instruct the system to skip the calculation of UFE.

At step 455, the system may apply the calculated UFE to a transmission loss-adjusted load. At this juncture, the process has three matching arrays of interval data for each segment: storing unadjusted load, distribution loss adjusted load, and transmission loss adjusted load. Two additional matching arrays may be created for storing UFE adjusted load, and Allocated UFE by segment (without the load). These five arrays may form the basis of reporting, output, and analysis for the remainder of the process.

UFE adjusted load is typically calculated by a proportional allocation of the total UFE in each interval by the ratio of the load in the interval for the segment divided by the total estimated load for all segments in the interval. UFE can also be allocated using a number of non-proportional methods that attempt to assign more of the UFE error into classes of service points that are less accurate in terms of available data. Since profile application is much less accurate than a transmission metered interval customer, less UFE is assigned to transmission metered interval customer and more assigned to scalar profiled customers. UFE is instead assigned using a modified proportional allocation that is proportional within like service points, but non-proportional across different service point types. Upon UFE allocation, the five LLS arrays are assigned attributes to identify the various components of the segment that are used later in the process for reporting and saving the data.

At step 460, the system may aggregate LLS segments to reporting levels. The aggregation system includes a dynamic reporting engine that generates, aggregates and loads ratio shares of any of the characteristics in the LLS segment and any that can be directly mapped from the LLS segment. During the input validation schedule, each record in the Data Aggregation Reports table active for the operating day is loaded into an array in memory for retrieval during the reporting process. After UFE application to each segment, the reporting code evaluates the characteristics of that segment (all five versions of the particular LLS segment) and all active reports to see if that segment should be added to a particular report. A new array for the particular report is created with elements in the array matching the unique elements in the report.

The Data Aggregation Reports table includes a number of options to specify the aggregation characteristics as well as a number of options. Each report evaluates the current segment for the various exclusions for each report to determine if the cut should be skipped. The report array is evaluated to determine if the report utilizes the custom reports table to include or exclude segments that would not be excluded or included based on the segment characteristics. If the report contains custom report elements, the segment is evaluated against each custom reporting element to determine if it should be excluded or included.

Any report that will include the current LLS segment has a set of arrays dynamically created to store the individual elements of the report and the reports interval data. If the report performs load ratio share calculations, a second interval array for the report is created to store the total of all segments included in the report for later use in the load ratio share calculation.

At step 465, the system may perform a bulk save and report LLS segments. Upon completion of the UFE allocation loop, the five LLS arrays are complete, along with arrays for each report active for the operating date. The LLS segments are saved to the LLS Interval table and dropped from active memory since all reports using those as inputs have completed their initial processing of the LLS data. An option can be used to turn off saves of the LLS arrays, which can be useful when performing ad hoc runs or trial runs where the LLS data is not needed upon completion of the process. The saves of LLS cuts is one of the longest running sections of code, so the save option can allow speedier test runs.

During a bulk save, the system may execute a stored procedure to save each cut individually, but feeds those individual cuts to the database from the save array. If any cuts fail to save properly, the array is looped through and individual saves are attempted for each element in the array. If any individual saves fail, the data for that element is reported to the Rules Language report for further data analysis and review. The process may abort upon completion of an individual save attempt for each element in the array.

At step 470, a bulk save and report of the UFE components may be performed. If a bulk save error is encountered, each element in the array may be saved individually. Any individual save errors may be reported and the process may abort.

At step 475, the system may process reporting aggregations. Each report array created after the UFE allocation process is retrieved from memory and finalized. If a report is found with zero elements, a notice is written to the Rules Language report noting the data aggregation report name did not include any elements. Each element in each report is rounded according to the report rounding option if any. Each element is scaled according to the report scaling option if any. Header attributes and custom attributes are set for each report element.

If the report includes load ratio share calculations, each element in the array is divided by the total summed load for the report to arrive at a load ratio share stored in a second array for the report. If the load ratio share option is not "O" (valid options are "Y" for Yes, "N" for No, and "O" for only, meaning don't save the load cuts used to create the load ratio shares), the reporting cuts are exported to a comma separated value file in the output directory. If the load ratio share option is not "N", the load ratio cuts are also saved to a comma separated value file in the output directory. Appropriate report and load ratio arrays are saved to the database. Any bulk saves that fail are retried using individual saves. Any element that is unsuccessful during the individual saves is reported. The process aborts with appropriate messages.

The market specific data aggregation rider 220 (see FIG. 2) may perform a procedure to process service point consumption data and characteristics into staging records in the scalar staging, IDR staging, and track segment tables. The procedure may accept four input variables: market, operating date, settlement type, and run number. From those variables, the procedure retrieves all necessary variables from the data aggregation run table. The procedure may return three variables: a status field, the count of scalar customers in the scalar staging table, and a count of interval customer represented in the IDR staging table.

Figure 5A:
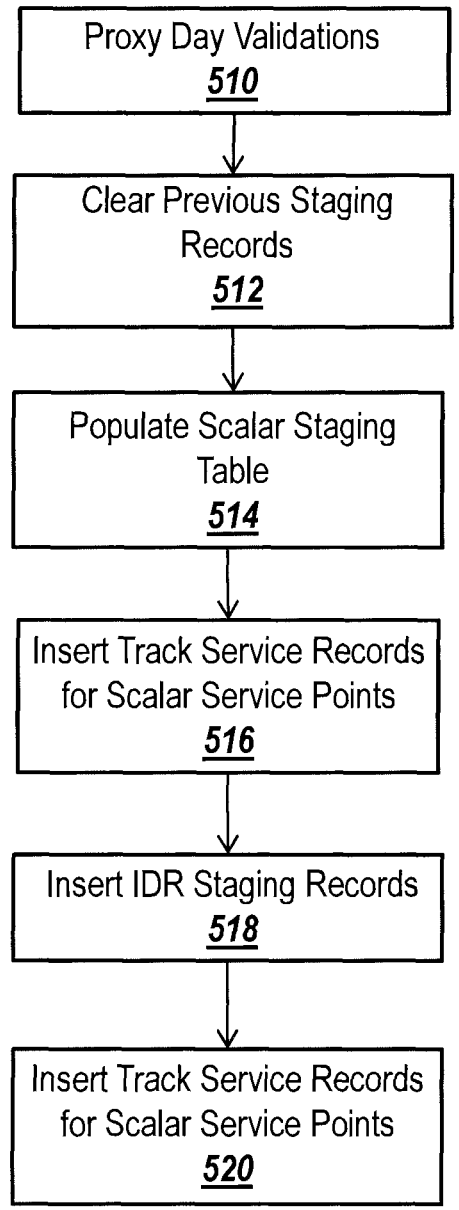
FIG. 5A is a flow chart depicting an exemplary data aggregation stored procedure for processing service point consumption data and characteristics into staging records.

The procedure creates data aggregator run history records for each query or section to allow for fine-grained analysis of performance trends. History records created by the procedure may be given a particular prefix in order to identify the history records. An exemplary procedure for creating staging records is depicted in FIG. 5A.

At step 510, the procedure verifies that the proxy day table has been populated with proxy days for the operating day. It also verified that there is at least one weather sensitive proxy day for each weather zone for the market. If proxy days are missing, the procedure returns an error message indicating the type of proxy days missing from the table for the trade date.

At step 512, if the truncate staging option is set, the procedure truncates the scalar staging, IDR staging, and track segment records. When the option is not set, the staging tables are cleared of data for the Data Aggregation Run ID using a standard delete statement.

At step 514, the scalar staging table is populated using a large join of multiple tables. The primary tables in the join are the service point aggregation attributes and the meter data channel and meter data read tables. Other tables include the service point, retailer history, location mapping, and profile class. The consumption records are sub-selected to return one usage record per service point that contains or is the closest to the trade date. The method field is determined by the available data for the service point. If there is no data, the method is set to "estimated no history." When there is no current data but available historical data, the method is set to "estimated history." If there is a meter that covers the trade date, the method is set to "usage summary."

At step 516, the unique segments from the scalar staging table are retrieved and stored in the track segment table. The segment index field in that table is set to an integer starting with 1 for each unique run. Upon completion of this insert, the scalar staging records are updated with the new segment index.

At step 518, IDR staging records are created for each interval metered service point active for the operating day. These records are populated with a proxy day and proxy day rank. The proxy day is the day that should be loaded to find the appropriate interval data for the service point. The proxy day rank identifies what "type" of day will be used.

At step 520, the unique segments from the IDR staging process are inserted into the track segment table. The segment index field in that table is set to an integer starting with 1 for each unique run. Upon completion of this insert, the IDR staging records are updated with the new segment index. In addition, the IDR parallel value for each segment is assigned by a mode function on the segment index and the number of expected parallel processes. This ensures that a segment will not be split across different parallel executions and eliminates the need to retrieve N sets of intermediate output and aggregate them to arrive at a total.

Figure 5B:
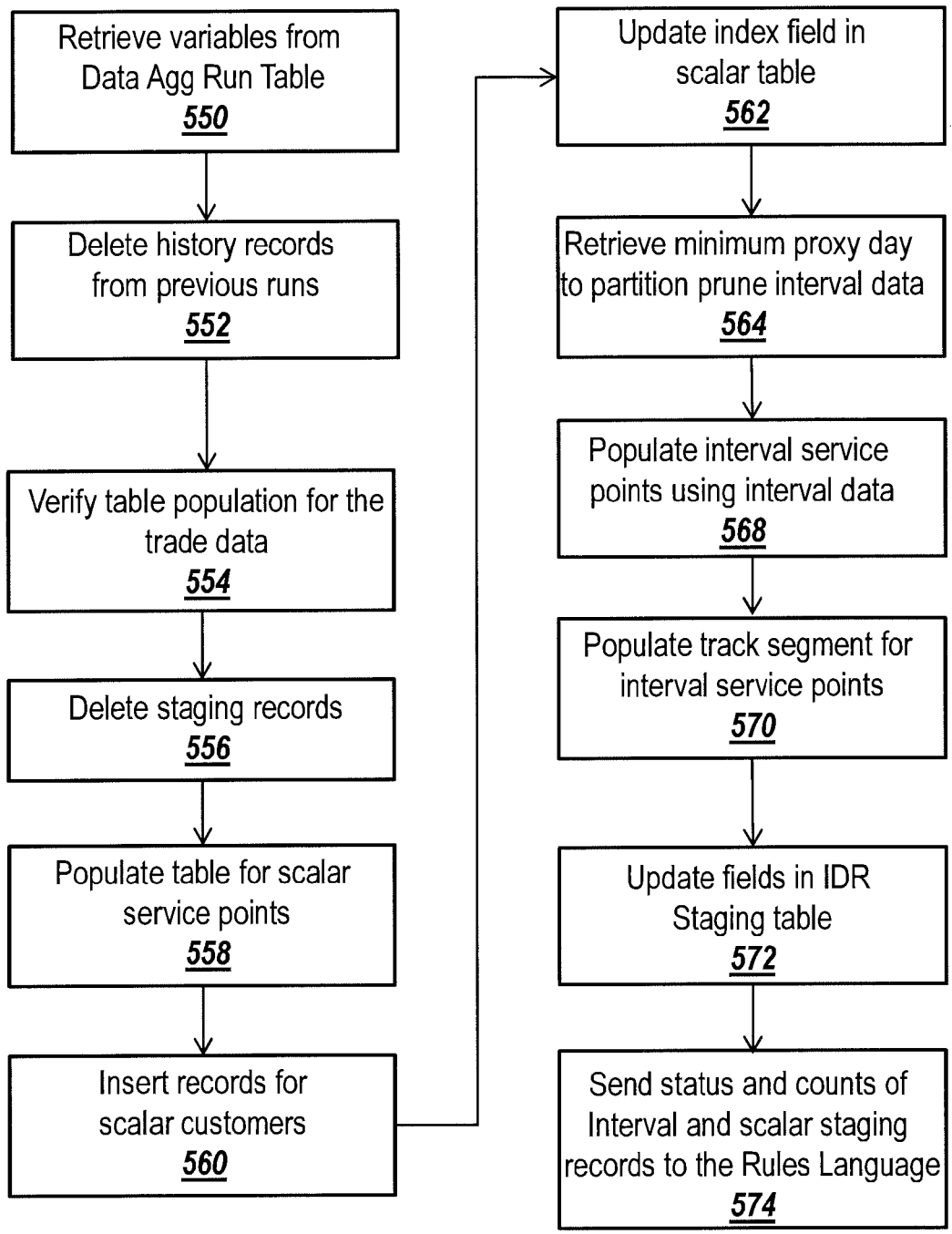
FIG. 5B is a flow chart depicting an exemplary procedure for pre-aggregating data.

In addition to the aggregation procedures discussed above with reference to FIGS. 4 and 5A, the data aggregator may be configured to efficiently and quickly pre-aggregate data to allow the overall process to be performed multiple orders of magnitude faster than a traditional linear approach. The preaggregation procedure includes a number of functional steps, as shown in FIG. 5B. At step 550, the system retrieves variables from the Data Aggregation Run ID table. At step 552, any preexisting Run History records for any previous run of the Data Aggregation Run ID are deleted.

At step 554, the system verifies that the Proxy Day table has been populated for the trade date, and at step 556, staging records for previous runs of the Data Aggregation Run ID are deleted.

At step 558, the Scalar Staging table is populated for scalar service points, and at step 560, Track Segment records are inserted for the scalar customers. A segment index field on the Scalar Staging table is updated at step 562.

At step 564, the system may retrieve the minimum proxy day to effectively partition prune the interval data. At step 568, the IDR Staging values are populated for interval service points using the interval data and proxy day tables to identify which day should be loaded for each service point. At step 470, the system populates the Track Segment data for interval service points At step 572, the segment index and IDR parallel fields are updated on the IDR Staging table, and finally at step 574, the system sends the status and counts of interval and scalar staging records to the Rules Language.

Figures 6A, 6B:
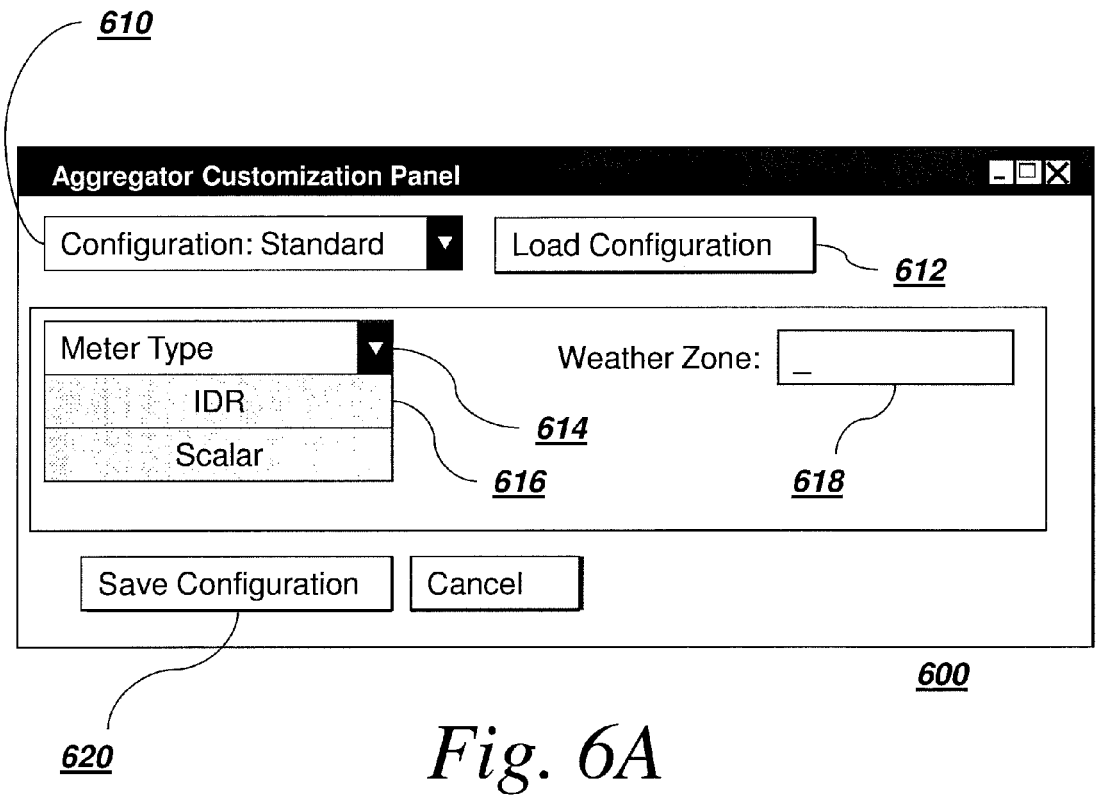
FIG. 6A is an exemplary interface 600 for specifying values for settings in a configuration of the aggregator and/or reporting framework.
FIG. 6B is another exemplary interface for specifying values for settings in a configuration of the aggregator and/or reporting framework.

In order to aggregate the data as described above, values are provided for the settings of the aggregator base configuration 260. Values may be specified in a number of ways. For example, FIG. 6A shows an exemplary graphical user interface 600 for specifying values for the settings.

The graphical user interface 600 may provide a menu 610, such as a drop-down menu, for allowing the user to select a predefined or previously-saved configuration. Selecting a previously defined configuration may cause the interface 600 to automatically propagate values for the settings based on the selected configuration. If a user desires to select a configuration that is not recognized in the menu 610 (e.g., a configuration saved on a removable storage medium, such as a CD), the user may select the load configuration option 612. Upon selecting the load configuration option 612, the user may be presented with a prompt or wizard allowing the user to select a location containing a saved configuration, such as a saved configuration file.

The graphical user interface 600 may allow a user to specify settings for values in a number of ways. For example, a drop down menu 614 may be provided allowing a user to select from a number of predefined options 616. Alternatively, a text box 618 may be provided for allowing a user to freely enter values for the settings. Other options, such as check boxes, radio buttons, sliders, etc. may be used to specify values for the settings.

The user may also be presented with a save configuration option 620. Upon selecting the save configuration option, the interface 600 may allow the user to store the configuration, such as in a configuration file.

A user need not specify values for the settings in a graphical interface or solely in a graphical interface. For example, FIG. 6B shows an exemplary textual interface for specifying values for the settings.

The textual interface includes a prompt 630 allowing the user to enter input for specifying values for settings. Values may be specified in any number of ways. For example, FIG. 6B depicts an exemplary input in which a user specifies a settings 632 and instructs the electronic device to store a value 634 for the setting 632 using an operator such as the equals ("=") sign.

Figure 7:
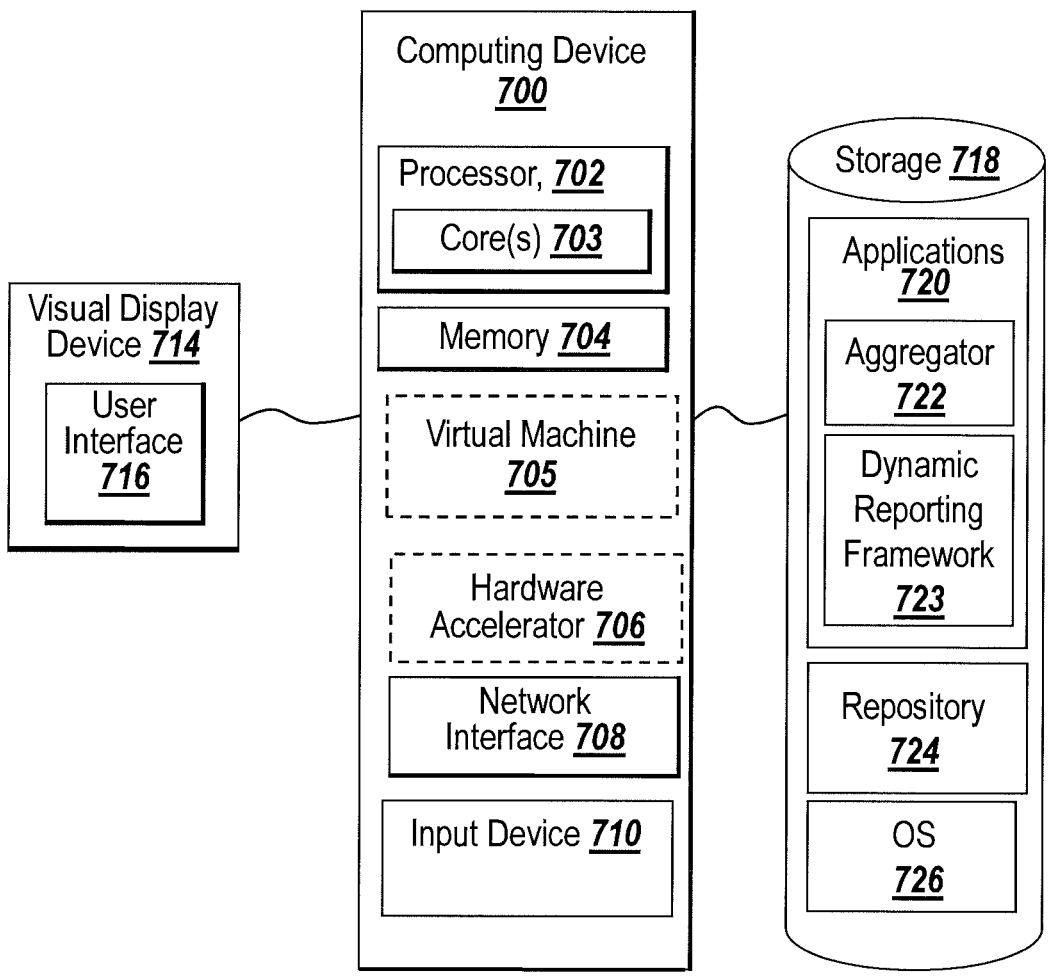
FIG. 7 depicts an exemplary computing device 600 suitable for practicing exemplary embodiments.

The above-described methodology may be practiced in any suitable electronic device. FIG. 7 depicts an exemplary electronic device 700 suitable for practicing exemplary embodiments described herein. The electronic device 700 may take many forms, including but not limited to a computer, workstation, server, network computer, quantum computer, optical computer, Internet appliance, mobile device, a pager, a tablet computer, a smart sensor, application specific processing device, etc.

The implementation of FIG. 7 is illustrative and may take other forms. For example, an alternative implementation of the electronic device 600 may have fewer components, more components, or components that are in a configuration that differs from the configuration of FIG. 7. The components of FIG. 7 and/or other figures described herein may be implemented in hardware based logic, software based logic and/or logic that is a combination of hardware and software based logic (e.g., hybrid logic); therefore, the components of FIG. 7 and/or other figures are not limited to a specific type of logic.

The processor 702 may include hardware or software based logic to execute instructions on behalf of the electronic device 700. In one implementation, the processor 702 may include one or more processors, such as a microprocessor. In one implementation, the processor 702 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 702 may include single or multiple cores 703 for executing software stored in a memory 704, or other programs for controlling the electronic device 700.

The electronic device 700 may include one or more tangible nontransitory computer-readable storage media for storing one or more computer-executable instructions or software for implementing exemplary embodiments. For example, a memory 704 included in association with the electronic device 700 may store computer-executable instructions or software, e.g., instructions for implementing and processing every module of a programming environment. The memory 704 may include a computer system memory or random access memory (RAM), such as dynamic RAM (DRAM), static RAM (SRAM), extended data out RAM (EDO RAM), etc. The memory 704 may include other types of memory as well, or combinations thereof.

In one implementation, one or more processors 702 may include virtual machine (VM) 705 for executing the instructions loaded in the memory 704. A virtual machine 705 can be provided to handle a process running on multiple processors so that the process appears to be using only one computing resource rather than multiple. Virtualization can be employed in the electronic device 700 so that infrastructure and resources in the electronic device can be shared dynamically. Multiple VMs 705 may be resident on a single processor 702.

A hardware accelerator 706, such as implemented in an ASIC, FPGA, or the like, can additionally be used to speed up the general processing rate of the electronic device 700.

Additionally, the electronic device 700 may include a network interface 708 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniB and, gigabit Ethernet, Myrinet) or some combination of any or all of the above. Network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 700 to any type of network capable of communication and performing the operations described herein.

The electronic device 700 may include one or more input/output (I/O) devices 710 such a keyboard, a multi-point touch interface, or a pointing device, for example a mouse, for receiving input from a user. The electronic device 700 may include other suitable I/O peripherals.

The input devices 710 may be connected to a visual display device 714. A graphical user interface (GUI) 716 may be shown on the display device 714.

A storage device 718 may also be associated with the computer 700. The storage device 718 may be, for example, a hard-drive, CD-ROM or DVD, Zip Drive, tape drive, or other suitable tangible computer readable storage medium capable of storing information. The storage device 718 may be useful for storing application software programs 720, data, and for storing a repository 724 and an operating system (OS).

The software programs may include an aggregator 722 for generating a data aggregation, and a dynamic reporting framework 723 for generating one or more reports summarizing the aggregated data based on the aggregation. The report may be customized based on one or more of the values provided for the aggregator settings.

The dynamic reporting framework 723 allows for user-configurable aggregations to be calculated during the aggregation process without requiring new computer code. Any combination of populated aggregation characteristics can be aggregated at the unadjusted, distribution adjusted, transmission adjusted, UFE adjusted load, or allocated UFE only (e.g., without the load) levels. Any report can be scaled or rounded as specified in a reporting table.

The aggregator 722 and reporting framework 723 may each be programmed with a base configuration that describes one or more settings for an aggregation run or a reporting scheme. The base configuration may be further defined by providing one or more values for the settings, as described above, and may be extended by adding one or more new, custom settings. The aggregator 722 and reporting framework 723 may communicate with each other in order to determine how to apply the settings to define a common configuration. Alternatively, the values may be stored in one or more database tables, such as the database tables 220, or in some other format at a location which is accessible to both the aggregator 722 and the reporting framework 723, such as the repository 724. Because the aggregator 722 and the reporting framework 723 may share the common base configuration and may each have access to the values, an aggregation may be performed using the aggregator, or a report may be generated using the dynamic reporting framework, after values are specified for the settings without needing to rebuild or redesign the aggregator or reporting framework.

The repository 724 may include one or more databases. The databases may be managed by database software, such as (but not limited to) Oracle Database, IBM DB2, and Microsoft SQL.

The electronic device 700 can be running any operating system 726 such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile electronic devices, or any other operating system capable of running on the electronic device and performing the operations described herein. The operating system may be running in native mode or emulated mode.

Exemplary embodiments may be provided as one or more electronic-device readable programs embodied on or in one or more mediums, such as a non-transitory electronic device-readable storage medium. The mediums may be, but are not limited, to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus.

In general, the electronic-device readable programs may be implemented in any programming language. Some examples of languages that may be used include Python, C, C++, C#, Java, Javascript, a hardware description language (HDL), UML, PLC, etc. Further, the computer readable programs may be implemented in a hardware description language or any other language that allows prescribing computation. The software programs may be stored on or in one or more mediums as object code. Instructions in the programming languages may be executed by one or more processors to implement the computer readable programs described in the programming languages, or alternatively the instructions may be implemented directly by hardware components other than a processor.

Figure 8:
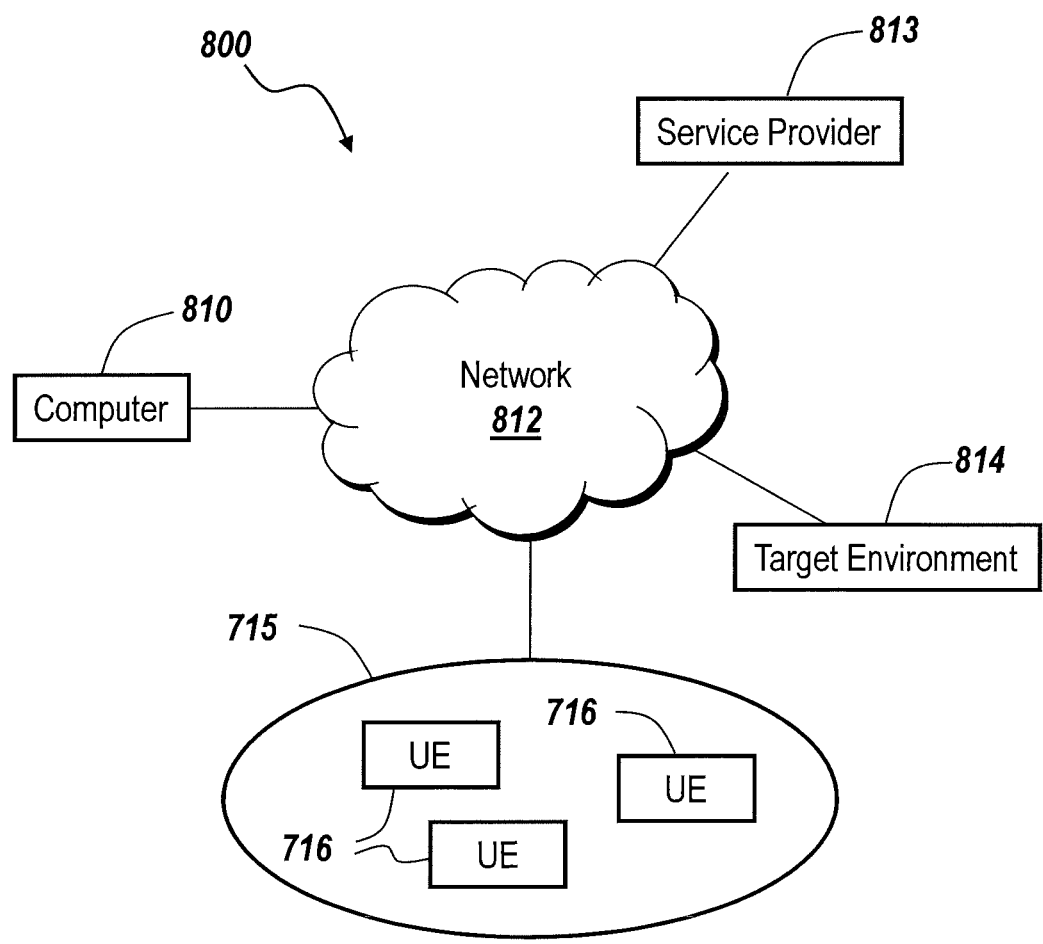
FIG. 8 depicts a networked system 700 suitable for practicing exemplary embodiments.

FIG. 8 illustrates an exemplary distributed implementation suitable for use with the exemplary embodiments described herein. A system 800 may include a computer 810, a network 812, a service provider 813, a target environment 814, and a cluster 815. The embodiment of FIG. 8 is exemplary, and other embodiments can include more devices, fewer devices, or devices in arrangements that differ from the arrangement of FIG. 8.

The network 812 may transport data from a source to a destination. Embodiments of the network 812 may use network devices, such as routers, switches, firewalls, and/or servers (not shown) and connections (e.g., links) to transport data.

The network 812 may be a hardwired network using wired conductors and/or optical fibers and/or may be a wireless network using free-space optical, radio frequency (RF), and/or acoustic transmission paths. In one implementation, the network 812 may be a substantially open public network, such as the Internet. In another implementation, the network 812 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11, Bluetooth, etc.), etc. The network 1112 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 813 may include a device that makes a service available to another device. For example, the service provider 813 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 814 may include a device that receives information over the network 812. For example, the target environment 814 may be a device that receives user input from the computer 810.

The cluster 815 may include a number of units of execution (UEs) 816 and may perform processing on behalf of the computer 800 and/or another device, such as the service provider 813. For example, in one embodiment, the cluster 815 may perform parallel processing on an operation received from the computer 800. The cluster 815 may include UEs 816 that reside on a single device or chip or that reside on a number of devices or chips.

The units of execution (UEs) 816 may include processing devices that perform operations on behalf of a device, such as a requesting device. In one embodiment, a UE can be a microprocessor, field programmable gate array (FPGA), and/or another type of processing device. Embodiments of UE 816 may include code, such as code for an operating environment. For example, a UE may run a portion of an operating environment that pertains to parallel processing activities. In one embodiment, the service provider 813 may operate the cluster 815 and may provide interactive optimization capabilities to the computer 810 on a subscription basis (e.g., via a web service).

Units of Execution (UEs) provide remote/distributed processing capabilities. A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment, a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. Embodiments of a software unit of execution may support one or more threads and/or processes when performing processing operations.

The term 'parallel programming' may be understood to include multiple types of parallel programming, e.g. task parallel programming, data parallel programming, and stream parallel programming. Parallel programming may include any type of processing that can be distributed across two or more resources (e.g., software units of execution, hardware units of execution, processors, microprocessors, clusters, labs, etc.) and be performed at substantially the same time.

For example, in one implementation, parallel programming may refer to task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task).

In another implementation, parallel programming may refer to data parallel programming, where data (e.g., a data set) is parsed into a number of portions that are executed in parallel using two or more software units of execution. In data parallel programming, the software units of execution and/or the data portions may communicate with each other as processing progresses.

In still another implementation, parallel programming may refer to stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays).

Other implementations may combine two or more of task, data, or stream parallel programming techniques alone or with other types of processing techniques to form hybrid-parallel programming techniques.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described above, the order of the acts may be modified in other implementations consistent with the principles of the invention. Further, non-dependent acts may be performed in parallel.

The names assigned to variables, tables, and other data structures herein are exemplary only, and are not meant to restrict the invention to particular implementations. Any name may be applied to the data structures used herein, and the names assigned to the data structures should not be interpreted to limit the type, characteristics, or structure of the data structure in any way.

In addition, implementations consistent with principles of the invention can be implemented using devices and configurations other than those illustrated in the Figures and described in the Specification without departing from the spirit of the invention. Devices and/or components may be added and/or removed from the implementations of the figures depending on specific deployments and/or applications. Also, disclosed implementations may not be limited to any specific combination of hardware.

Furthermore, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise.

The scope of the invention is defined by the claims and their equivalents.

The invention claimed is:

1. A non-transitory electronic device readable storage medium storing instructions for aggregating and reporting data, the instructions when executed causing one or more processors to:
provide a customizable aggregator for retrieving and analyzing the data, the aggregator being deployed in a base configuration that is not customized for any utility provider;
receive a plurality of settings at the aggregator, each setting accepting one or more values, the plurality of settings together describing a configuration of the aggregator, wherein the aggregator accepts different values for the settings to generate different configurations;
configure the aggregator by providing one or more values for one or more of the settings to customize the aggregator for a specified utility provider, the values representing input data that defines a manner in which the aggregator aggregates the data and corresponding to a set of aggregation requirements of the specified utility provider wherein the settings specify how transmission losses are calculated for the specified utility provider and specify an identity of a market for which aggregation is being performed;
access the data;
aggregate the data to summarize the data, combine the data into a new representation, draw a conclusion from the data, or collect related data,
wherein the aggregating is based on one or more of the provided values such that the aggregator is configurable into the different configurations without providing additional code for the aggregator beyond the base configuration; and
generate a report summarizing the aggregated data, wherein the report is generated based on one or more of the provided values.

2. The medium of claim 1, wherein configuring the aggregator further comprises retrieving the one or more settings from one or more database tables.

3. The medium of claim 2, wherein generating a report further comprises retrieving the one or more settings from the one or more database tables.

4. The medium of claim 1, wherein the data aggregation is calculated without rebuilding the aggregator after configuring the aggregator.

5. The medium of claim 1, further comprising instructions for providing a dynamic reporting framework for generating the report.

6. The medium of claim 5, wherein the data aggregation is calculated and the report is generated without rebuilding the dynamic reporting framework after configuring the aggregator.

7. The medium of claim 1, wherein data available to the aggregator determines one or more reporting options for generating the report.

8. The medium of claim 1, wherein the data is aggregated during an aggregation run, and the aggregator is configured at a run-time of the aggregation run.

9. The medium of claim 1, wherein the settings comprise one or more of a retailer identity, a distribution company, a meter type, a weather sensitivity, a weather zone, a profile type, a TOU type, a loss class, location information, and campaign information.

10. The medium of claim 1, wherein the values for the settings are retrieved from one or more database tables that store variables and characteristics used during a data aggregation process.

11. The medium of claim 1, wherein the data is loaded into a memory of the aggregator prior to aggregating the data.

12. An electronic device implemented method comprising:
providing a customizable aggregator for retrieving and analyzing data, the aggregator being deployed in a base configuration that is not customized for any utility providers;
receiving a plurality of settings at the aggregator, each setting accepting one or more values, the plurality of settings together describing a configuration of the aggregator, wherein the aggregator accepts different values for the settings to generate different configurations;
configuring the aggregator by providing one or more values for one or more of the settings to customize the aggregator for a specified utility provider, the values representing input data that defines a manner in which the aggregator aggregates the data and corresponding to a set of aggregation requirements for the specified utility provider wherein the settings specify how transmission losses are calculated for the specified utility provider and specify an identity of a market for which aggregation is being performed;
accessing the data;
aggregating the data to summarize the data, combine the data into a new representation, draw a conclusion from the data, or collect related data,
wherein the aggregating is based on one or more of the provided values such that the aggregator is configurable into the different configurations without providing additional code for the aggregator beyond the base configuration; and
generating a report summarizing the aggregated data, wherein the report is generated based on one or more of the provided values.

13. The method of claim 12, further comprising providing a dynamic reporting framework for generating the report, wherein the data aggregation is calculated and the report is generated without rebuilding the dynamic reporting framework after configuring the aggregator.

14. A system comprising:
a storage for storing data; and
a processor for:
providing a customizable aggregator for retrieving and analyzing the data, the aggregator being deployed in a base configuration that is not customized for any utility providers;
receiving a plurality of settings at the aggregator, each setting accepting one or more values, the plurality of settings together describing a configuration of the aggregator, wherein the aggregator accepts different values for the settings to generate different configurations;
configuring the aggregator by providing one or more values for one or more of the settings to customize the aggregator for a specified utility provider, the values representing input data that defines a manner in which the aggregator aggregates the data and corresponding to aggregation requirements of the specified utility provider wherein the settings specify how transmission losses are calculated for the specified utility provider and specify an identity of a market for which aggregation is being performed;
accessing the data;
aggregating the data to summarize the data, combine the data into a new representation, draw a conclusion from the data, or collect related data,
wherein the aggregating is based on one or more of the provided values such that the aggregator is configurable into the different configurations without providing additional code for the aggregator beyond the base configuration; and
generating a report summarizing the aggregated data, wherein the report is generated based on one or more of the provided values.

15. The system of claim 14, wherein the processor further provides a dynamic reporting framework for generating the report, wherein the data aggregation is calculated and the report is generated without rebuilding the dynamic reporting framework after configuring the aggregator.

* * * * *